Figure 6:
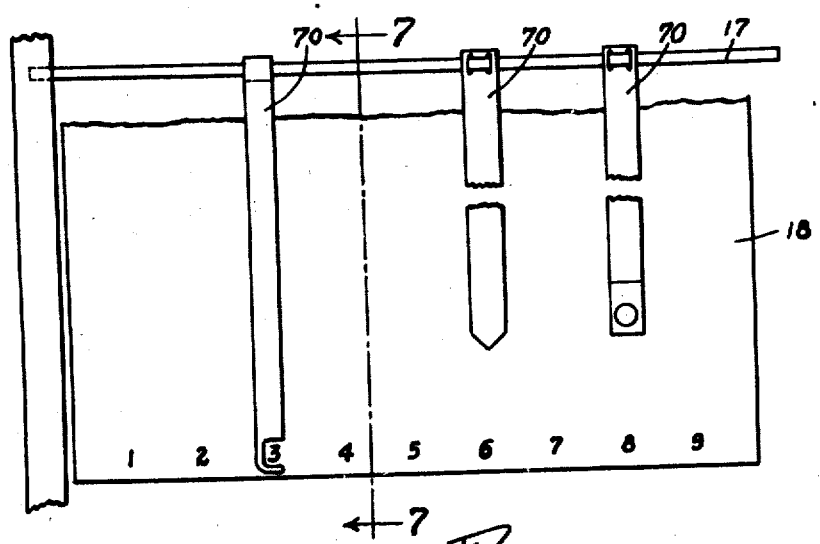
Figure 7:
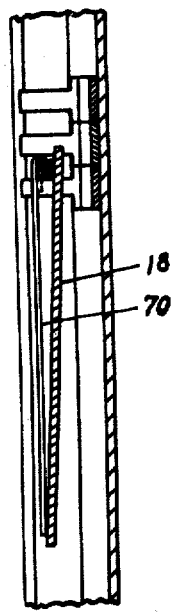

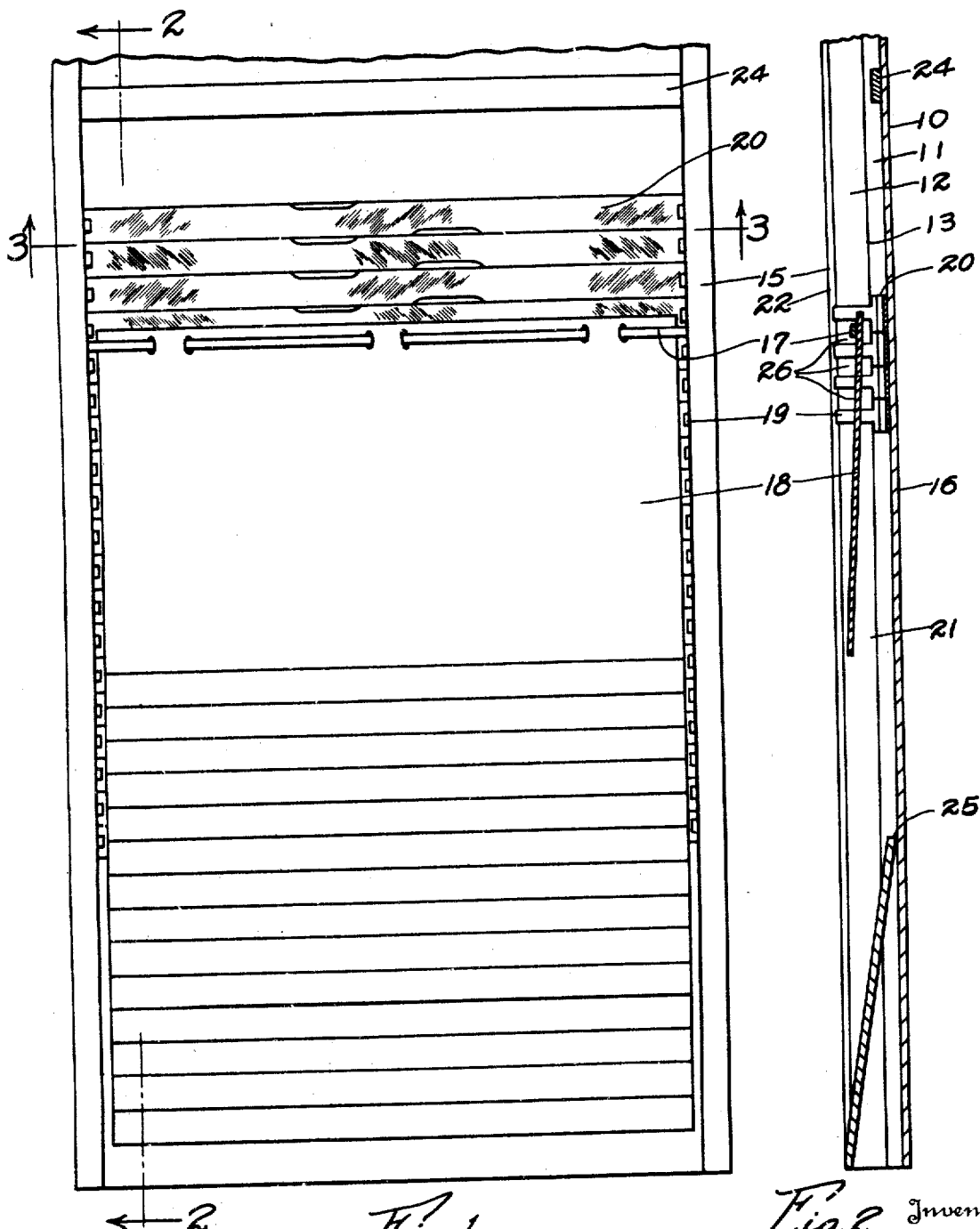

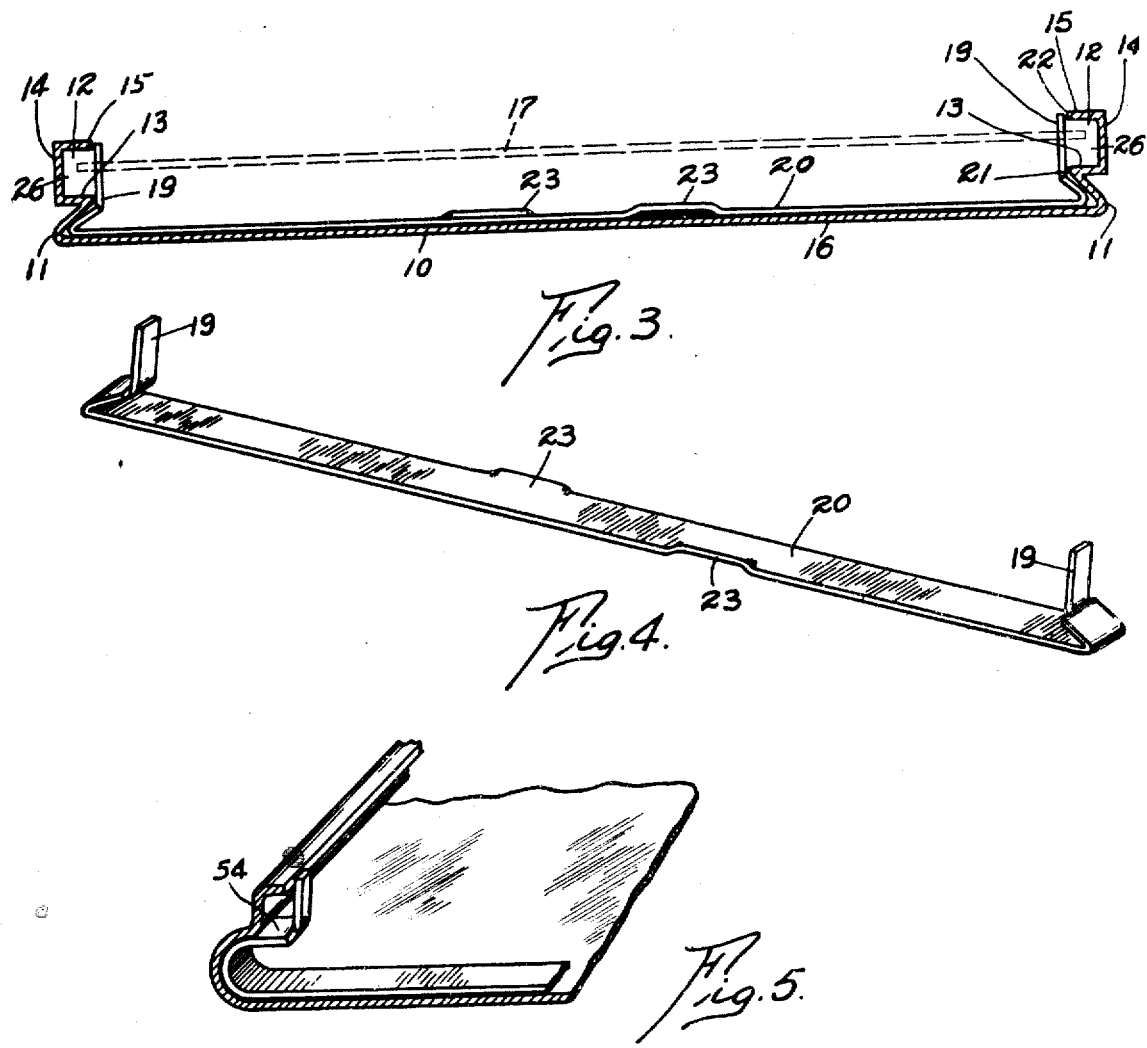

Feb. 14, 1933. S. B. FREIBERG 1,897,930
CARD FILING DEVICE
Filed Jan. 9, 1928   3 Sheets-Sheet 3

Inventor
Stanley B. Freiberg,
By Murray & Zugelter
Attorneys

Patented Feb. 14, 1933

1,897,978

UNITED STATES PATENT OFFICE

CARLETON ELLIS, OF MONTCLAIR, NEW JERSEY, ASSIGNOR TO ELLIS-FOSTER COMPANY, A CORPORATION OF NEW JERSEY

RESINOUS CONDENSATION PRODUCT

No Drawing.  Application filed December 1, 1928.  Serial No. 323,215.

This invention relates to resins and especially to resinous products of the type of resinated ureas and substituted ureas, including sulphur-containing bodies such as the thio resins, as will be more fully hereinafter set forth.

The present application is a continuation in part of my prior applications Serial No. 689,165 filed January 28, 1924; Serial No. 735,600 filed September 3, 1924; and Serial No. 28,505, filed May 6, 1925 now Patent No. 1,846,853.

The invention is particularly concerned with resinous products obtained by condensation of urea or substituted ureas with aldehydes such as formaldehyde, such products also containing thio derivatives and particularly resinous sulphur containing products. Various examples of products coming within the scope of the invention are given below.

For example a resinous product, may be obtained in the making of which dimethylol urea is incorporated with phenol sulphur resins, prepared, for example, by reacting on phenol with sulphur chloride. Thus, one part by weight of phenol is treated with two to two and one-quarter parts of sulphur monochloride to yield a resin. This resin may be incorporated with 10% and upwards of dimethylol urea.

Likewise, various fillers or extending agents may be employed for example mineral fillers gypsum, whiting, mica, infusorial earth, clay and asbestos or organic fillers such as cotton flock, wood pulp, saw dust, wood flour, cork, leather scrap, etc.

Molding compounds may be made by mixing such fillers as for example equal parts of filler and binder to form molding powders. The filler may be simply ground with the binder or may be impregnated by means of a solution. Or the materials may be incorporated and worked out into sheeted form. This may be accomplished by mixing on differential rolls and then running through sheeting rolls.

Paper or cloth may be impregnated and sheets pressed together to form blocks. The binding agent in the form of a solution may be used as a lacquer or incorporated with filler may be employed as a cement.

Organic acids such as phthalic, salicylic and the like may be used in the preparation of the resinated urea.

A number of fabricated products may be made, among these being applications in the varnish, lacquer, paint and enamel industry, as an impregnating material, for hat stiffening and as a cement. It may be used in substitution for glass for various purposes such as lenses, wind shields, revolving doors, etc., in making imitation gems, beads, cigarette and cigar holders, pipe stems, umbrella and cane handles, fountain pens, billiard balls, ash trays, phonograph records, camera parts, grinding wheels, gears, artificial amber, insulation, white or light colored molded articles, buttons, ink stands, ornamental articles, dishes, etc. It may be reinforced by the use of appropriate wire netting or by sheets of paper or cloth. Or articles may be built up of impregnated sheets or fibrous material pressed together in a hot press.

One of the fillers mentioned above, namely mica, is especially considered. Instead of using the phenol sulphur resin, I may employ thiourea formaldehyde resin preferably in conjunction with urea formaldehyde resin. The resinated thiourea with the resinated urea thus provides a sulphur-containing resinous product.

In case mica powder is used as a filling material plastic compositions are obtained which may be shaped by hot pressing to make molded articles.

Urea formaldehyde resin has the property of hardening or setting when heated and this reaction may be used to bring about a curing of the product in a hot press or in a baking oven or under exposure to heat in other ways.

30 parts by weight of urea are dissolved in 120 parts of aqueous 40 per cent formaldehyde and 3 parts of phthalic acid or phthalic anhydride are added. As the urea dissolves in the formaldehyde solution there is a decided lowering of temperature. Then the solution begins to show signs of turbidity which change is accomplished by a gradual rise in temperature. The reaction is exothermic. The solution finally becomes milky about the time the spontaneous temperature rise has reached its maximum. In one case the temperature went from 28 to 67° C. in about 20 minutes. The reaction mixture was allowed to stand for 1 hour during which time the temperature dropped to 42° C. Heat was applied and the temperature was raised over a period of one-half hour to 76° C. and then more gradually over a period of 2 hours to 94° C. After heating for about 45 minutes the mixture began to clear but a longer heating was required to completely clarify the solution. A syrupy solution was obtained having a specific gravity of 1.151 at 25° C. the solid content of which was 44 per cent.

Thin splittings of mica of about one inch in diameter were coated on one side with this solution and these were laid on a wire screen in such a manner that the edges overlapped to form a sheet. The sheet was dried for about 10 minutes at 80° C. and then coated on the other side and similarly dried. Two such sheets were placed together and on either side was placed an additional sheet which was coated on one side only, that side being the one in contact with the two inner sheets. The four sheets were amalgamated into a composite sheet in the hydraulic press under a pressure of 2000 pounds for 10 minutes at 120° C. A firm stiff well-bonded composite sheet made up of the cemented mica splittings was thus obtained. The sheet was light colored and translucent.

In another case the syrup was diluted with water to contain 5.5 per cent of the urea resin and sheets of mica were cemented in a similar manner.

In order to make a product which can be readily diluted with water it is best to carry out the reaction according to the above formula under a reflux condenser. A syrup is thus obtained which can be diluted with two to three times its volume of water without turbidity and beyond this dilution a small amount of alcohol will prevent turbidity. If however the reaction is carried out in an open vessel the addition of water in say equal volume may cause a heavy turbidity.

In like manner the syrup may be mixed with mica powder with which may be incorporated other fillers if desired. Most of the fillers employed in the plastic molding industry at the present time are suitable without specific enumeration. In some cases it is desirable to add other synthetic resins or natural resins, gums, asphalts, coloring matter, rubber and other materials which modify the properties of the product. It should be understood, that the foregoing binder is preferably prepared from mixtures of urea and thiourea by subjecting these substances to appropriate treatment with formaldehyde. In place of formaldehyde, paraform and other polymers of formaldehyde may be employed and in some cases hexamethylenetetramine by itself or in conjunction with formaldehyde. Furthermore the invention does not preclude the use of other aldehydes capable of yielding with urea substances having an adhesive or cementing property.

Preferably I employ an acid catalyst such as phthalic acid or other organic acid such as benzoic, chloracetic, oxalic acids and the like. It is also possible to use catalytic proportions of mineral acids such as hydrochloric acid in some cases.

In other cases an alkaline catalyst such as ammonia or caustic soda may be employed. Sometimes it is feasible in preparing the syrup to start the reaction with a small amount of an alkaline catalyst and then acidulate with an acid catalyst such as phthalic acid.

The invention however contemplates the use of the resin whether made in acid, alkaline or neutral solution. It also may include urea phenol formaldehyde resin prepared for example by reacting on urea and phenol with formaldehyde in the presence of phthalic acid or other catalyst.

While the sulphur-containing resinous product of urea and thiourea may be prepared by the simultaneous action of formaldehyde (or other aldehyde) on the urea and thiourea, the phenol sulphur resin is best prepared separately and incorporated with the resinated urea by means of a solvent vehicle, mixing rolls or in any other suitable manner. The sulphur resin may be present, as mentioned above, in proportions of 10 per cent and upwards. Ordinarily equal parts of resinated urea and phenol sulphur resin may be used. The employment of cresol sulphur resin, xylenol sulphur resin and the like is not precluded.

Other derivations of urea which may be used in the preparation of the resinous product or composite of the present invention are, for example, guanidine and various reactive resinifying guanidine bodies, or substituted guanidines, thiocarbanilide, substituted thioureas, and so forth.

In most cases I prefer to have present a substantial proportion of the sulphur (thio) resin sufficient to provide a readily-fusible material capable of flowing freely under heat and pressure, to yield a sharp imprint of the mold, when employed for making shaped articles. If the resinous complex or composite has two components such as resinated urea and resinated thiourea a range of recommended proportions is 1:3 to 3:1. If the complex or composite comprises (a) resinated urea (resinated guanidine or other non-sulphur resinated urea derivatives) (b) resinated thiourea (resinated thiocarbanilide and the like) and (c) phenol sulphur resin (cresol, xylenol, naphthol sulphur resin) the proportions may be (A) 2:1:1, (B) 1:1:2, (C) 1:2:1 or otherwise varied according to the requirements in hand.

Some of the sulphur resins such as those made from phenol and sulphur chloride, especially if not quite free of solvent, may exhibit a tendency to blacken steel molds when employed in plastic molding compositions. Apart from the possibility of using chrome steel or other resistant alloy steel molds, there exists a method described in Patent 1,564,002 of incorporating a small proportion of phosphoric acid with the phenol sulphur resin. The present invention does not preclude the possibility of using phosphoric acid to accelerate the resinification of urea and formaldehyde with subsequent incorporation of one of the phenol sulphur resins, thus to avail of the protective effect of the phosphoric acid with respect to the sulphur resin, and giving to the acid the joint role of catalyst and protecting agent.

The foregoing, taken largely from the several pending patent applications cited, suffices to illustrate the resinous complex or composite of the present invention comprising the aldehyde reaction products of urea and a sulphur-containing compound; specifically the formaldehyde reaction products of urea and thiourea; urea and phenol sulphur resin; urea, thiourea and phenol sulphur resin. If the latter is not prepared with too high a proportion of sulphur chloride, it is reactive with formaldehyde, hexamethylene tetramine, acetals and other methylene-yielding bodies. Hence there is at hand the means of inter-resinification of urea resin and one or more resins which contain sulphur in combination. When the initial resinous bodies are separately prepared, mixed and then hot-pressed, the reactions taking place in the mold are conducive to inter-resinification and to the derivation of properties not possessed by either resin individually and not necessarily their mean or average, collectively considered.

The invention thus additionally comprehends the inter-resinified sulphur-containing products of heat and pressure of the ureas (or active derivatives or substituted compounds thereof) with a reactive methylene body; one such resinous complex or composite being the formaldehyde reaction products of urea and thiourea.

These resinous complexes containing aldehyde reaction products of urea and resinifying sulphur-containing compounds may be heat treated below temperatures at which undesirable properties such as blistering result. Temperatures of from 110 to 130° C. may thus be used.

In application Serial No. 689,165 there is disclosed and broadly claimed the urea formaldehyde types of resins produced in the presence of catalysts particularly acid catalysts such as inorganic and organic acids, and these resins heat treated at temperatures below that at which blistering results.

In application Serial No. 735,600 there is disclosed and claimed laminated products produced by the use of urea resin binders including formaldehyde reaction products of urea and thiourea as well as the binders themselves.

In application Serial No. 28,505 there is disclosed and claimed the urea type resins produced in two stage reactions the first stage involving basic media and the last stage acid media together with heat treatment of such products at temperatures below that at which blistering takes place.

What I claim is:

1. A resinous composite containing the resinous aldehyde reaction products of urea and thiourea produced by heat under more than atmospheric pressure.

2. A resinous composite containing the resinous formaldehyde reaction products of urea and thiourea produced by heat under more than atmospheric pressure.

3. A resinous composite comprising the sulphur containing reaction products of urea and thiourea with formaldehyde formed under heat and pressure.

4. A composite containing the aldehyde reaction products of urea and thiourea produced in the pressure of an acid catalyst.

5. A composite containing the formaldehyde reaction products of urea and thiourea produced in the presence of an acid.

6. A plastic condensation product containing the formaldehyde reaction products of two carbamid compounds produced in the presence of an acid.

7. A plastic condensation product containing the aldehyde reaction products of two carbamid products produced in the presence of an acid.

8. A heat treated, substantially bubble free plastic condensation product of two carbamid compounds and an aldehyde produced in the presence of an acid.

9. A resinous composite containing the resinous aldehyde reaction products of urea and a resinifying sulphur-containing compound produced by heat under more than atmospheric pressure.

10. The process of forming resinous composites which comprises reacting urea and an aldehyde in the presence of a resinifying sulphur-containing compound entering into the reaction product, and subjecting such reaction product to further condensation by heating under more than atmospheric pressure.

11. The process of forming condensation products which comprises reacting urea and formaldehyde in the presence of a resinifying sulphur-containing compound entering into the reaction product, and subjecting such reaction product to further condensation by heating under more than atmospheric pressure.

12. The process of forming condensation products which comprises reacting urea and thiourea with formaldehyde, and subjecting such reaction product to further condensation by heating under more than atmospheric pressure.

CARLETON ELLIS.

CERTIFICATE OF CORRECTION.

Patent No. 1,897,978.  February 14, 1933.

CARLETON ELLIS.

It is hereby certified that error appears in the printed specification of the above numbered patent requiring correction as follows: Page 3, line 98, claim 4, for "pressure" read "presence". The interchanged papers forming part of the grant should be read in their proper sequence; and that the said Letters Patent should be read with these corrections therein that the same may conform to the record of the case in the Patent Office.

Signed and sealed this 11th day of April, A. D. 1933.

M. J. Moore,
Acting Commissioner of Patents.

(Seal)

action product to further condensation by heating under more than atmospheric pressure.

12. The process of forming condensation products which comprises reacting urea and thiourea with formaldehyde, and subjecting such reaction product to further condensation by heating under more than atmospheric pressure.

CARLETON ELLIS.

CERTIFICATE OF CORRECTION.

Patent No. 1,897,978.            February 14, 1933.

CARLETON ELLIS.

It is hereby certified that error appears in the printed specification of the above numbered patent requiring correction as follows: Page 3, line 98, claim 4, for "pressure" read "presence". The interchanged papers forming part of the grant should be read in their proper sequence; and that the said Letters Patent should be read with these corrections therein that the same may conform to the record of the case in the Patent Office.

Signed and sealed this 11th day of April, A. D. 1933.

M. J. Moore,
Acting Commissioner of Patents.

(Seal)

CERTIFICATE OF CORRECTION.

Patent No. 1,897,930. February 14, 1933.

STANLEY B. FREIBERG.

It is hereby certified that error appears in the printed specification of the above numbered patent requiring correction as follows: Page 3, line 19, claim 7, for "tray" read "ways": and that the said Letters Patent should be read with this correction therein that the same may conform to the record of the case in the Patent Office.

Signed and sealed this 9th day of May, A. D. 1933.

(Seal)

M. J. Moore.
Acting Commissioner of Patents.